United States Patent [19]

Schulz et al.

[11] Patent Number: 4,745,993
[45] Date of Patent: May 24, 1988

[54] CENTRIFUGAL CHAIN ASSEMBLY FOR A MOTOR VEHICLE

[76] Inventors: Gerd Schulz, Besselstrasse 9; Hans-Peter Hartleif, Rotbergskamp 20c, both of 2100 Hamburg 90, Fed. Rep. of Germany

[21] Appl. No.: 838,664

[22] Filed: Mar. 12, 1986

[30] Foreign Application Priority Data

Mar. 14, 1985 [DE] Fed. Rep. of Germany ....... 3509061
Mar. 14, 1985 [DE] Fed. Rep. of Germany ....... 3509062
Mar. 14, 1985 [DE] Fed. Rep. of Germany ....... 3509063

[51] Int. Cl.$^4$ .............................................. B60T 1/00
[52] U.S. Cl. ................... 188/4 B; 152/208; 301/42
[58] Field of Search ............... 152/208, 210; 188/4 A, 188/4 B; 301/42

[56] References Cited

U.S. PATENT DOCUMENTS

| | | | |
|---|---|---|---|
| 2,283,948 | 5/1942 | Ridgway | 188/4 B |
| 2,442,322 | 5/1948 | Daley | 188/4 B |
| 2,747,691 | 5/1956 | Lakey et al. | 188/4 B |
| 2,771,161 | 11/1956 | Jesionowski | 188/4 B |
| 2,865,471 | 12/1958 | Chaussee | 188/4 B |
| 2,886,138 | 5/1959 | Bruner | 188/4 B |

FOREIGN PATENT DOCUMENTS 110674 11/1917 United Kingdom .

Primary Examiner—Donald E. Czaja
Assistant Examiner—Thomas Bokan
Attorney, Agent, or Firm—Wood, Herron & Evans

[57] ABSTRACT

A centrifugal chain assembly having a holder for a skid prevention device for a motor vehicle which can be put into operation when needed and which can be made inoperative again is formed by a plurality of elements which are axially movable and also pivotable relative to one another, which, by their construction and movability provided for adjustment can be employed equally at both sides of a motor vehicle and can be used for different types and models of motor vehicles. An adjustable ball joint is provided between a centrifugal wheel and the free end of a pivot arm, which pivots the centrifugal wheel, together with chain lengths secured to the centrifugal wheel, from a rest position into an operative position, in which the centrifugal wheel abuts against the side face, directed inwardly of the motor vehicle, of a driven motor vehicle wheel and is set in rotation by the wheel during travel. A centrifugal wheel carrier holds the centrifugal wheel of the centrifugal chain assembly eccentrically on a pivot arm, a resilient element being provided between the centrifugal wheel carrier and the pivot arm. In this way, the centrifugal wheel can carry out a pivotal movement relative to the pivot arm when disturbances are produced by the chain lengths and, when the disturbances have been ended, can be drawn back into its rest position.

48 Claims, 7 Drawing Sheets

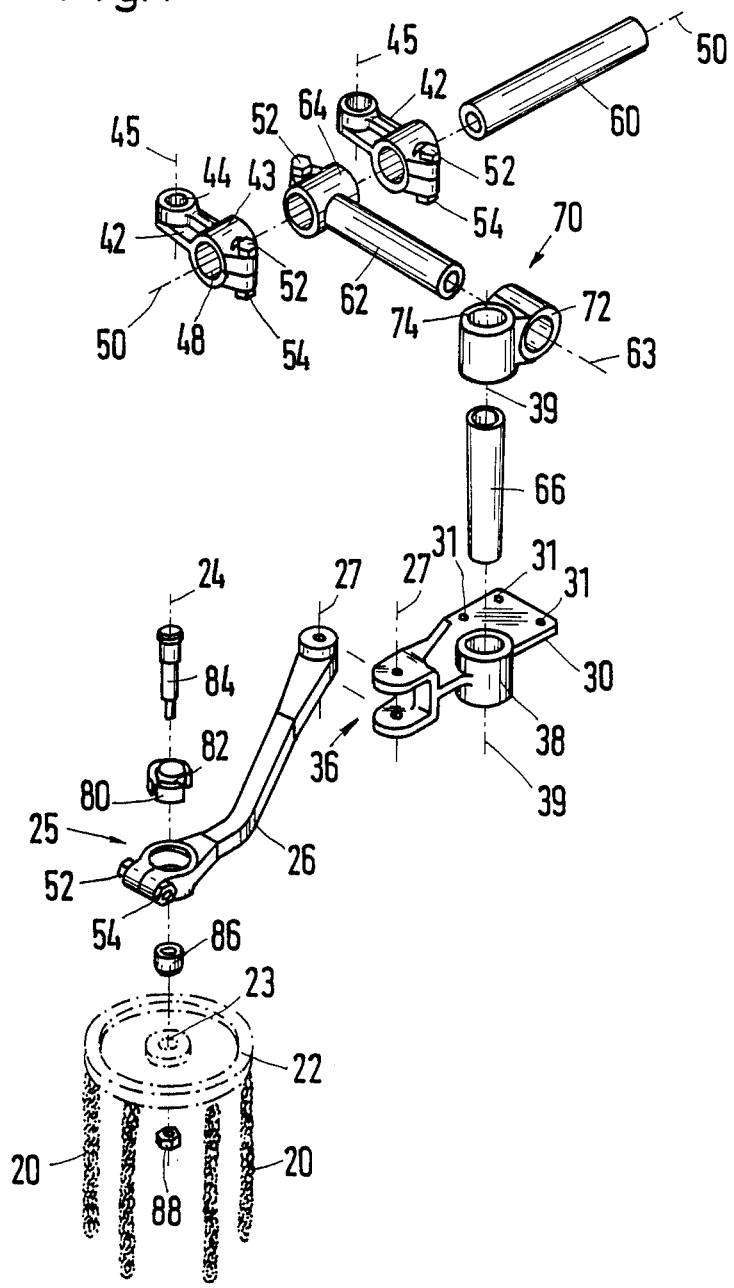

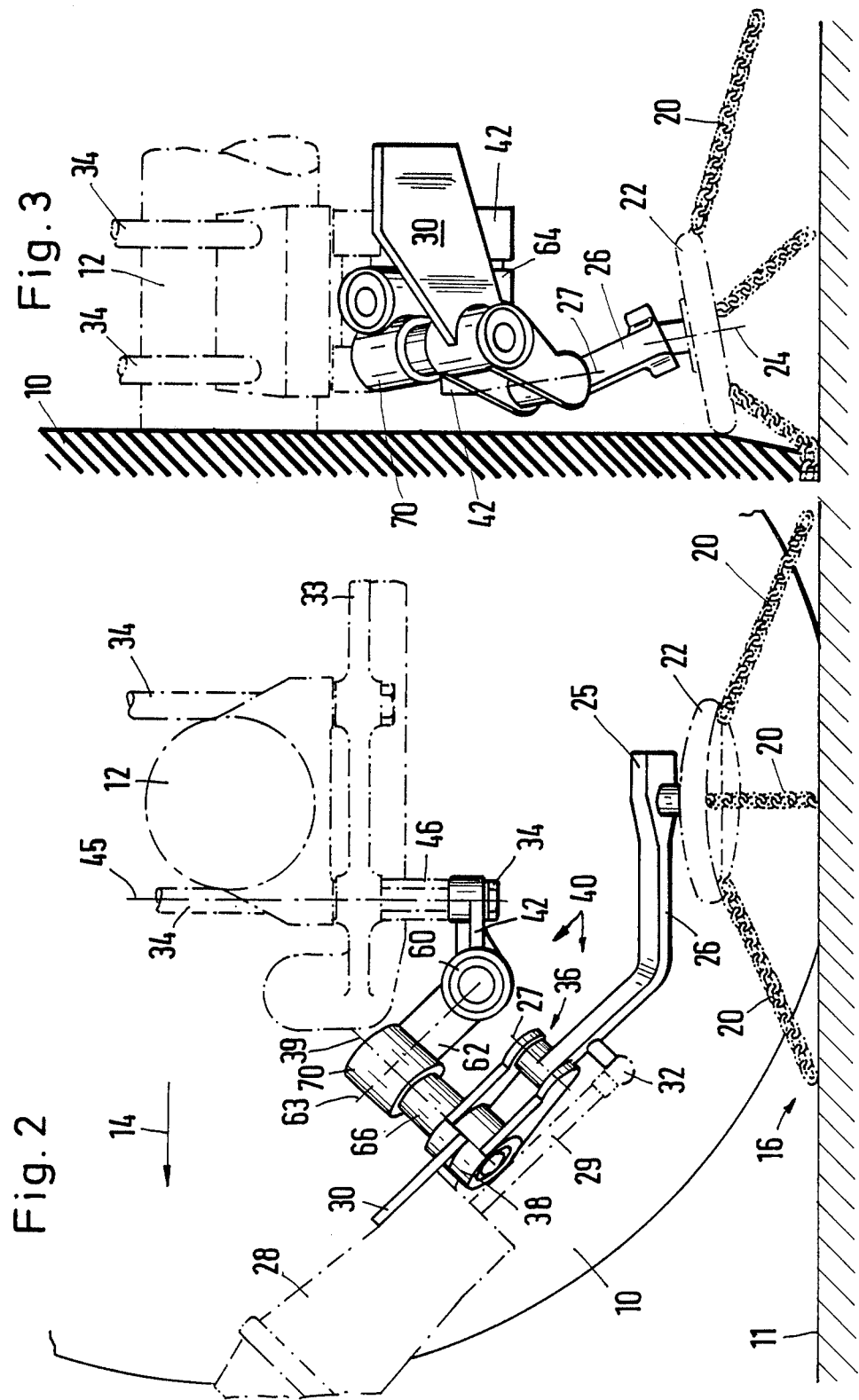

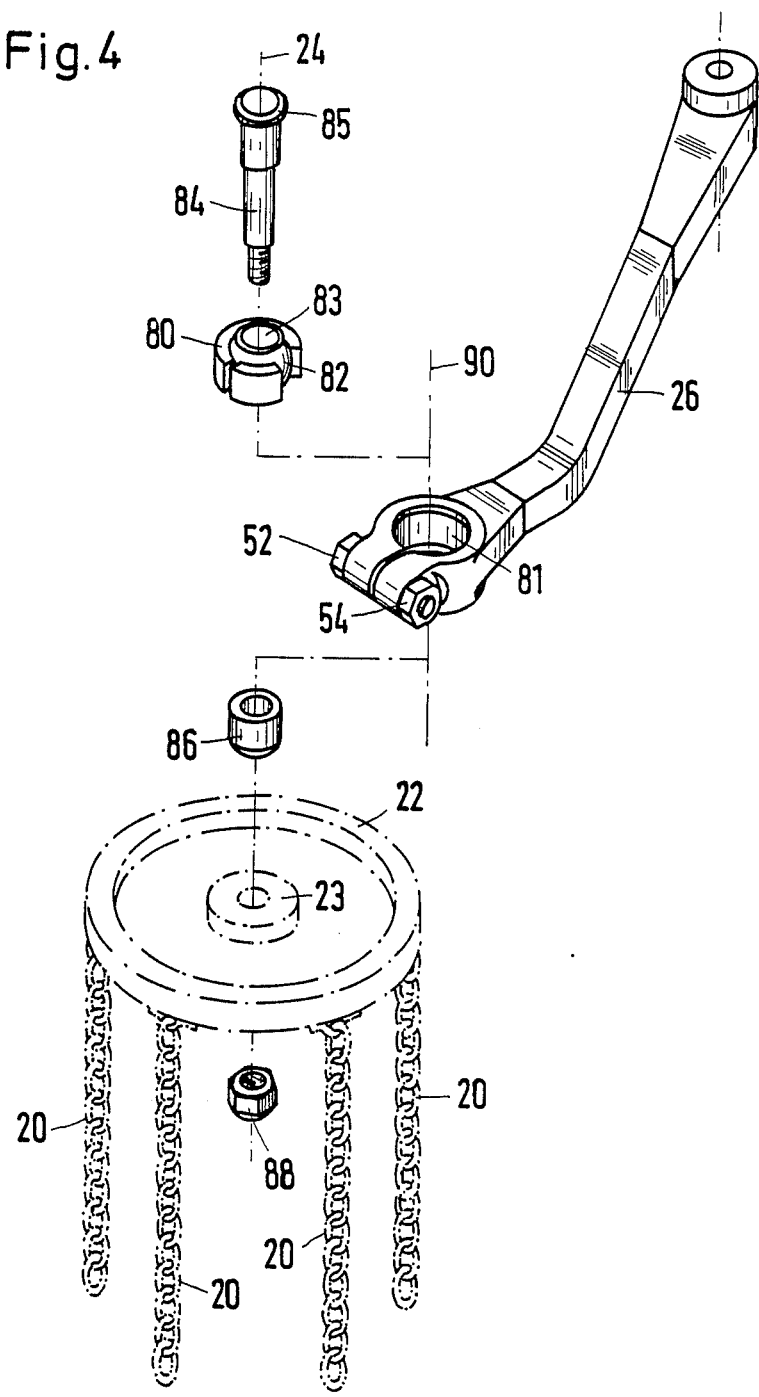

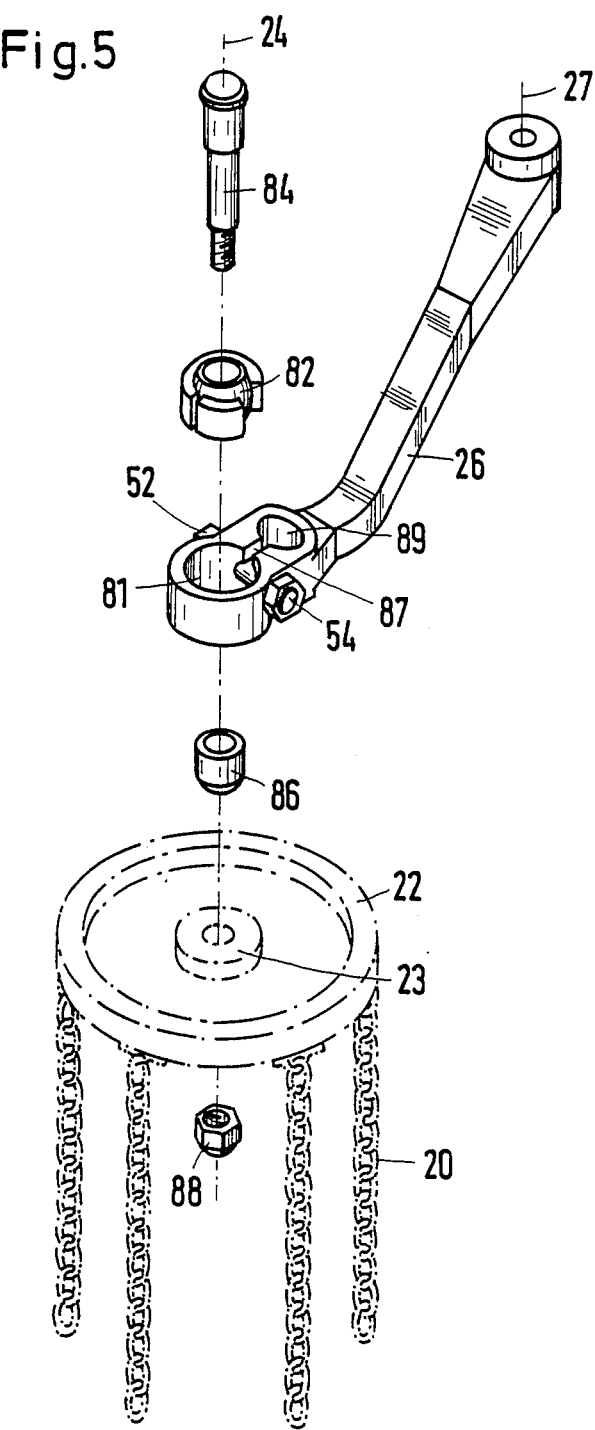

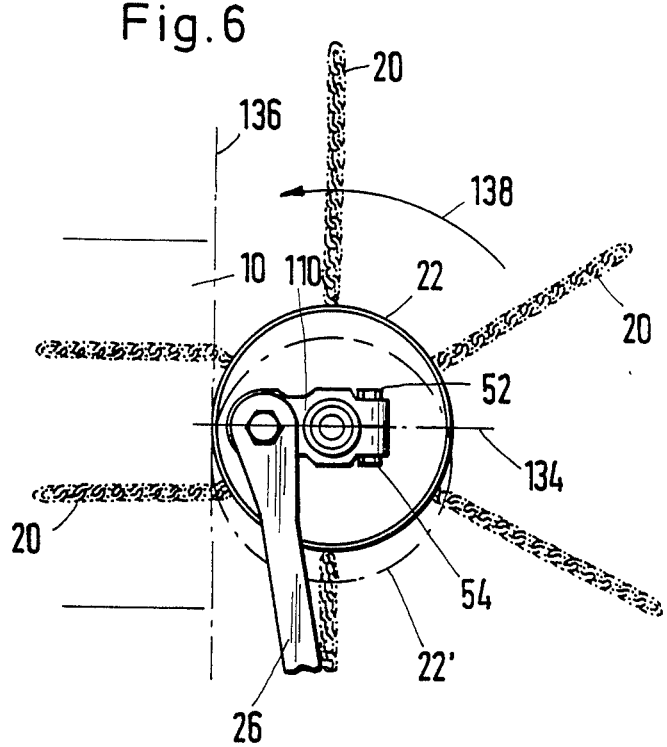

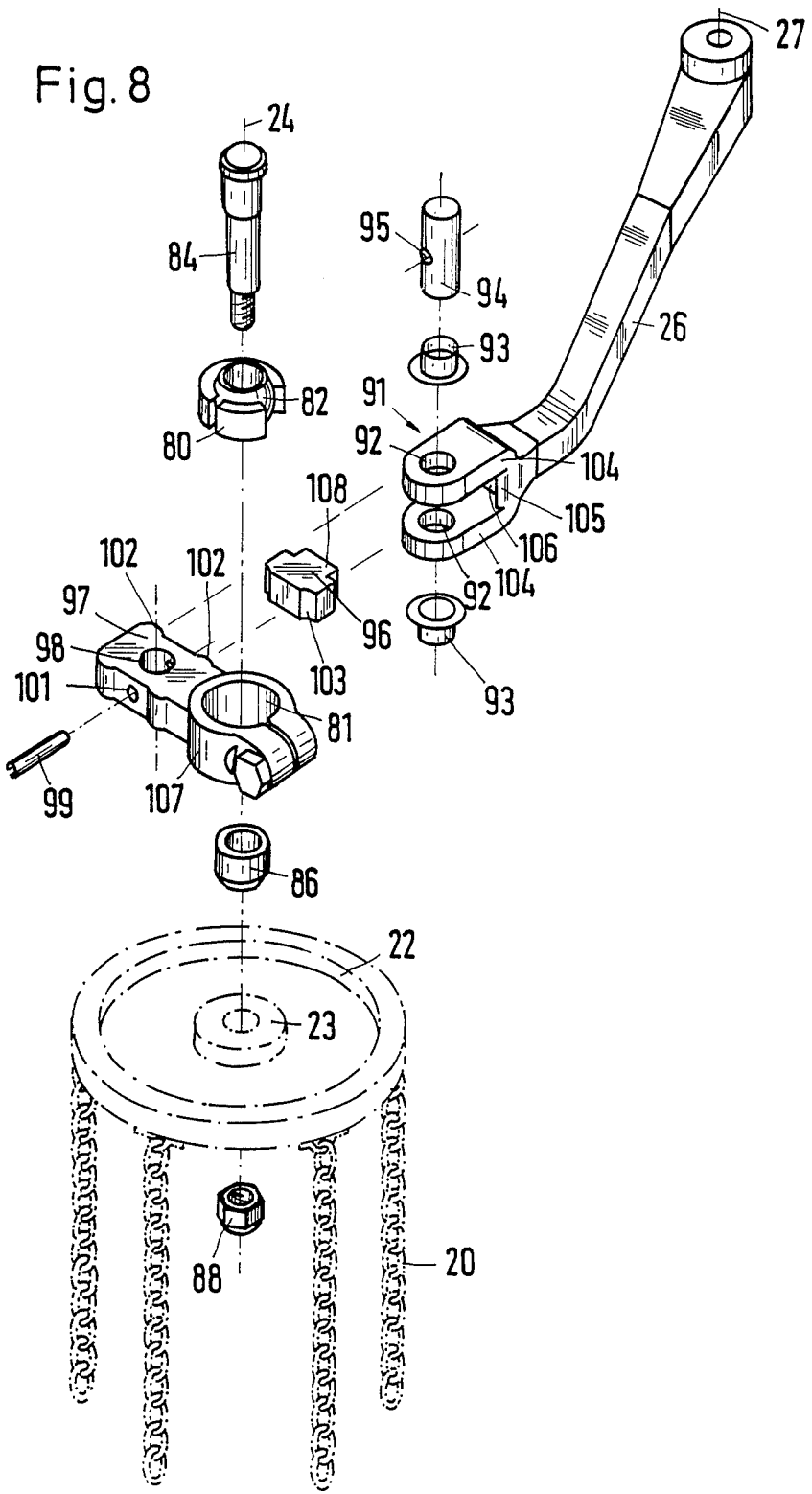

CENTRIFUGAL CHAIN ASSEMBLY FOR A MOTOR VEHICLE

DESCRIPTION

The invention relates to a centrifugal chain assembly for motor vehicles, which has a holder fixed at one side to the motor vehicle and a skid prevention device carried by the holder and comprising a centrifugal wheel carrying a plurality of lengths of chain and rotatably mounted on a pivot arm forming part of the holder, the skid prevention device being pivotable by means of a pivotation mechanism from a rest position to an operative position, in which the centrifugal wheel is urged against a side wall, inwardly of the motor vehicle, of a motor vehicle wheel, so as to be rotated by the motor vehicle wheel.

Numerous centrifugal chain assemblies have been described in the state of the art. They constitute a winter travel protection device, employed mainly in commercial vehicles, which can be switched on by the driver when required and which substantially improve traction between the drive wheels and the roadway.

Such a winter travel protection device was first described in British Pat. No. 110,674. It was comparatively expensively constructed and could be put into operation by means of a tension cable. Following this state of the art, during the course of decades various modifications and improvements have become known. Thus, a pneumatic operation of centrifugal chain assemblies, which furthermore were very bulky, was first described in U.S. Pat. No. 2,283,948. A compact construction can be seen in U.S. Pat. No. 2,442,322. U.S. Pat. No. 2,865,471 disclosed, in particular, a novel form of the centrifugal wheel. A truly compact construction of a centrifugal chain assembly which, however, has substantial constructional problems is disclosed in German Published application No. 3,100,975. A variant is disclosed in German Published application No. 2,914,366. Finally, a centrifugal chain assembly has been offered on the German market for a substantial time under the name ONSPOT, which has the first above-mentioned features.

A winter travel protection device which can be switched on, according to the above-mentioned state of the art or, also, according to modifications which operate without centrifugal chains (U.S. Pat. Nos. 2,747,691; 2,771,161 and 2,886,138, German Pat. Specification No. 1,162,216, French Pat. No. 1,362,388 and French Published Pat. application No. 2,036,889), is useful, in particular, for commercial vehicles since their range of action during the winter season regularly extends over snowy and snow-free regions and when operated with conventional snow chains require complicated installation and removal, which lengthens the journey times.

Nevertheless, centrifugal chain assemblies are in use to only a comparatively small extent. The reason coming into account for this, in particular, is that the holder connecting the centrifugal wheel to the vehicle must be made substantially different not only from manufacturer to manufacturer, but in most cases, also, from motor vehicle type to motor vehicle type and in each individual case must be provided in two mirror-image variants for mounting at the right and the left sides of the motor vehicles. This almost unlimited multiplicity of types results, particularly, in substantial development costs, manufacturing costs and costs for storage. It is also a complication that correspondingly numerous installation steps must be taken into account and that the workplaces available for fitting the devices to existing vehicles, due to the multiplicity of types, cannot accumulate sufficient experience, so that the installation of the winter travel protection devices is made unnecessarily expensive.

Centrifugal chain assemblies of the first-mentioned type, moreover, only operate satisfactorily, under various conditions arising, if the centrifugal wheel is located in its operative position on the motor vehicle wheel at an accurately defined position. Deviations from the proper position, due to external circumstances, e.g. after replacement of the tire type, lead to wear-promoting vibrations of the centrifugal wheel, to an irregular insertion of the chains into the gap between the motor vehicle wheel and the surface of the roadway and, in the most unfavorable circumstances, to a permanent dislocation of the centrifugal wheel by bending of the holder for the centrifugal chain assembly.

Furthermore, during operation of the centrifugal chain assembly, from time to time a considerable vibration of the centrifugal wheel and the pivot arm can be observed, although the centrifugal wheel driven by friction from the motor vehicle wheel is located in an exact position relative to the motor vehicle wheel and, also, with an apparently advantageous inclination of its plane of rotation relative to the motor vehicle wheel.

Experiments have led to the realization that these vibrations, which over long continuing periods act unfavorably not only on the bearing but also on the holder of the centrifugal chain assembly, occur in particular when the driving motor vehicle tire is loaded to a greater extent than normal or has a too low air pressure. It has, furthermore, been shown that, after long periods of operation with a vibrating centrifugal wheel, this vibration continues even when the loading of the tire or the tire pressure is returned to its proper value.

With this background, it is an object of the present invention to provide a centrifugal chain assembly of the first-mentioned type which no longer requires different components for the two sides of a motor vehicle and which enables a fast, correct and also secure assembly of the centrifugal chain assembly and, therewith, contributes both to a reduction of the manufacturing costs and also to a reduction of the installation costs.

It is, furthermore, an object of the invention to provide a centrifugal chain assembly which makes possible a fine adjustment and a subsequent readjustment of the centrifugal wheel during or after fitting of the centrifugal chain assembly, in as trouble-free a manner as possible.

It is a further object of the present invention to substantially reduce the tendency of the centrifugal wheel to vibrate.

This object is fulfilled by providing a centrifugal chain assembly including a carrier element connected to a centrifugal chain carrying wheel and including a bushing for a plug member. The plug member is supported by means of an adjustable pivot bearing to a carrier bolt. The carrier bolt is in turn connected to two holders mounted upon the vehicle.

The result of the claimed solution goes far beyond the results sought.

Considering the range from production up to the sale of the centrifugal chain assembly, then it is apparent that with the proposed holder system, comprising of a few different parts, it is not only no longer necessary to take into account the two opposite sides of the vehicle, but with these few elements the majority of existing vehicle types of all manufacturers can be covered. Experiments have shown that it is only necessary occasionally to modify the installion of the holder which, however, must be taken into account in all prior art construction arrangements. The tooling, manufacturing and storage costs, and the costs for development, are drastically reduced.

With respect to installation, the cost reduction is comparatively large. In addition, it must be realized that the fitter always obtains the same simple parts, independently of the type of motor vehicle, so that during the installation he does not each time have to install new parts on new parts. He is notified, when being provided with the parts, at which position in the axial region the holder is fixed and he can be provided with a simple prefabricated template, for example, of plastics foam material, which determines the spatial position of the centrifugal wheel in all axes with respect to the motor vehicle wheel. The fitter then lays the centrifugal wheel in this template, mounts the holder and connects the holder and the centrifugal wheel with the few parts, which are familiar to him, without a still greater amount of adjustment being required before the final clamping or welding of the parts.

It is, furthermore, to be emphasized that the extensive state of the art discloses a multiplicity of differently constructed skid prevention devices and an equal multiplicity of differently constructed holders therefor, but that none of these holders is even approximately as universal as that proposed according to the present invention.

Advantageously, the center of the plane of rotation of the centrifugal wheel is located at a spacing below the center of an adjustable ball joint arranged between the pivot arm and the centrifugal wheel.

In a preferred embodiment of the invention, it is provided that the ball joint has a divided metal bushing and a ball element provided in the shell-shaped inner boring thereof, which has a boring extending through its middle for receiving a bolt which, in turn, carries the centrifugal wheel, and that the divided bushing is fixed in a boring of adjustable diameter on or in the pivot arm, and that the bolt has a collar, which abuts the ball element.

While the positioning of the centrifugal wheel could previously if necessary be effected by bending parts of the holder, and therefor usually remained inaccurate, and while also the fitter for various reasons had little experience in the fitting and adjustment of the centrifugal wheel, the consequence of the proposal according to the invention is that, now, a very accurate positioning, even at any distance of time from the original installation of the centrifugal chain assembly, is possible and the fitter can be provided with an expensive adjustment template, which previously was not conceivable since, during adjustment, it was necessary to work with substantial forces and also with heat on the resiliently deflectable elements of the holder.

When the centrifugal wheel according to the invention is mounted for movement in a predetermined plane on a pivot arm against the loading of a spring element, in a modified embodiment the spring element can connect the pivot arm with a lever, the centrifugal wheel can be rotatably mounted at the free end of this lever and the free end of the lever can be positioned away from the motor vehicle wheel driving the centrifugal wheel, at the other side of the pivot arm located in its operational position.

Additionally, the centrifugal wheel can be fixed to the lever so as to be adjustable with respect to the above-mentioned pivot plane and a ball joint, securable by means of a clamp device, can be provided at the free end of the lever/housing for the movable arrangement of the centrifugal wheel with respect to the above-mentioned plane.

With the help of this modification, the range of tolerance within which the resiliently running centrifugal wheel according to the invention interrupts the vibrations is increased. This widening of the range of tolerance is helpful, in particular, in cases in which, for example, the tire type of the respective motor vehicle is changed.

Operational experiments with a centrifugal chain assembly constructed in accordance with the present invention have shown that the centrifugal wheel constantly has an outstandingly stationary running, even under varying conditions of operation, which, furthermore, is not adversely effected when the chain lengths are delayed in reaching the free space behind the motor vehicle.

BRIEF DESCRIPTION OF THE DRAWINGS

The invention is descirbed below with reference to the exemplary emobodiments shown in the drawings, in which:

FIG. 1 shows an exploded view of the elements of the holder employed for a first embodiment;

FIG. 2 shows a view in elevation of the side, facing inwardly of the vehicle, of a partially-illustrated motor vehicle wheel with a holder mounted on the wheel shaft and the skid prevention device, according to FIG. 1, carried by this holder, in its operational position;

FIG. 3 shows a view in elevation in the longitudinal direction of the motor vehicle of the arrangement shown in FIG. 2;

FIG. 4 shows an exploded view of the parts journalling the centrifugal wheel on the pivot arm;

FIG. 5 shows a modified embodiment of the parts shown in FIG. 4;

FIG. 6 shows, in a schematic illustration, a plan view of the lower parts of the modified embodiment of the centrifugal wheel assembly;

FIG. 8 shows a further modified embodiment of the centrifugal wheel assembly.

Figure 7:
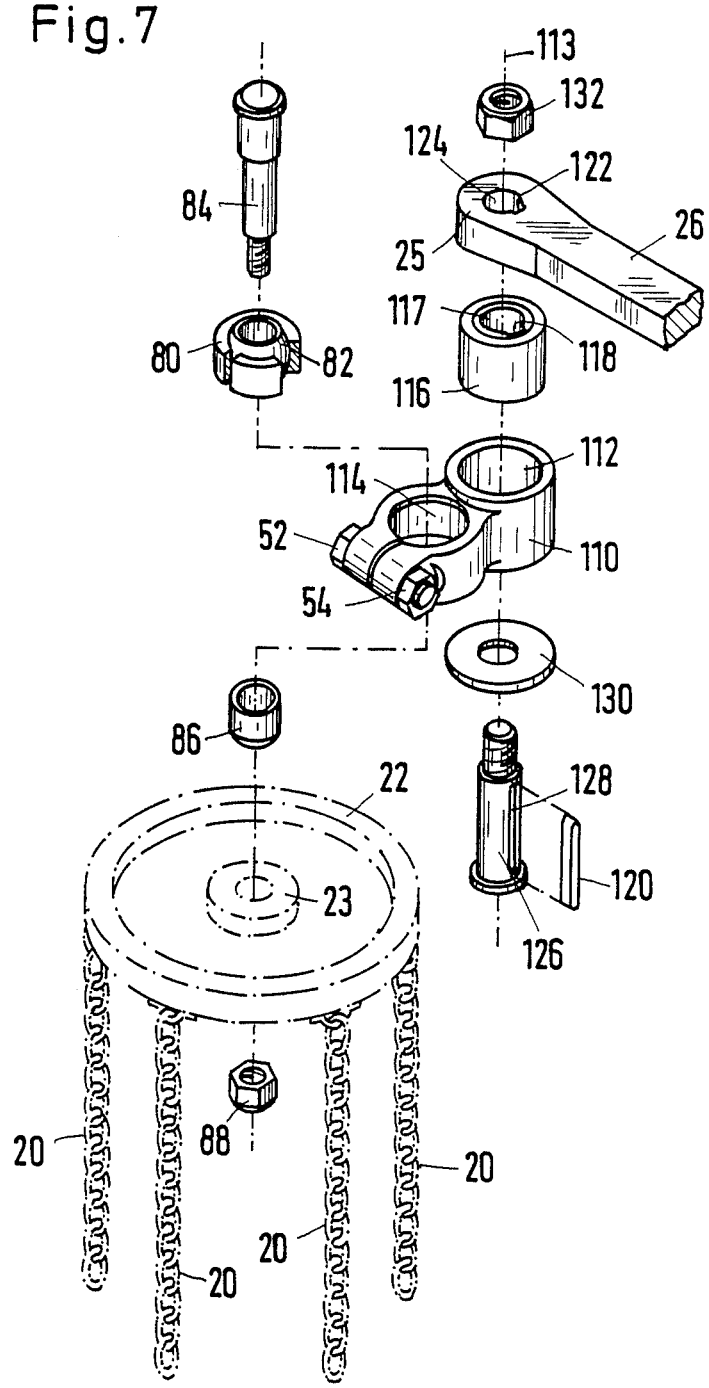
FIG. 7 shows an exploded view of the parts of a centrifugal wheel carrier, according to FIG. 6, provided between the pivot arm and the centrifugal wheel.

The skid prevention device shown, in particular, in FIGS. 2 and 3 for a motor vehicle wheel 10 has, in known manner, a plurality of lengths of chain 20 which are each secured at one end thereof to a centrifugal wheel 22. When the centrifugal wheel rotates, the lengths of chain extend radially, under the effect of centrifugal force, and are distributed around an imaginary conical surface relative to the centrifugal wheel. By the arrangement and orientation of the centrifugal wheel with respect to the motor vehicle wheel 10 and the surface of the roadway 11, the lengths of chain are successively thrown into the space 16, located forwardly with respect to the direction of travel, between the rotating motor vehicle wheel 10 and the roadway 11 and the motor vehicle wheel then rolls over the lengths of chain.

The rotation of the centrifugal wheel 22 is produced, in known manner, by the centrifugal wheel being pressed into abutment with the side of the tire of the motor vehicle wheel 10 facing inwardly of the motor vehicle and, by this transmission of force from the tire, is caused to rotate as long as the motor vehicle wheel 10 itself is rotating.

The centrifugal wheel 22 is secured, by means of a bearing 23 shown in FIG. 1, so as to be rotatable about an axis of rotation 24 at the free end 25 of a pivot arm 26. The pivot arm 26 is, in turn, mounted so as to be pivotable about an axis of pivotation 27 on a carrier element 30 which, in turn, is connected to the motor vehicle as still to be described.

The pivotable mounting of the centrifugal wheel 22 enables, on one hand, the preloading between the centrifugal wheel 22 and the motor vehicle wheel 10 to be achieved in a simple manner and, above all, serves to bring the centrifugal wheel out of the operational position shown in FIGS. 2 and 3 into a rest position, which can be seen for example, in FIG. 1 of German Published Pat. application No. 3,100,975, in which the lengths of chains hang freely downwardly from the centrifugal wheel 22 and can no longer contact the roadway, and in which the centrifugal wheel 22 is out of contact with the motor vehicle wheel 10.

For effecting the pivotation of the pivot arm 26 there is provided, in the present embodiment, a pneumatic cylinder 28 provided with a piston rod 29. The pneumatic cylinder 28 is secured to the carrier element 30 by means of bolts (not shown) and by means of borings 31 (FIG. 1). The piston rod 29, the relative position and direction of which can be seen, in particular, in FIG. 2, has at its free end a ball joint 32, which serves to connect the piston rod 29 with the pivot arm 26 at a position between the axes 24 and 27. FIG. 2 shows the extended position of the piston rod 29, which corresponds to the operational position of the pivot arm 26 or the centrifugal wheel 22. If the piston rod 29 of the pneumatic cylinder 28 is retracted, by means of compressed air or a spring, then the centrifugal wheel 22 is moved to the right, as viewed in FIG. 3, away from the motor vehicle wheel 10. By the inclination of the pivot axis 27, which can be seen in FIGS. 2 and 3, the centrifugal wheel 22 thereby simultaneously moves upwardly.

For securing the skid protection device, as so far described, to the motor vehicle there is provided a holder 40 which comprises a plurality of elements. The holder 40 ensures that the centrifugal wheel 22 remains in its operational position as independently as possible from the condition of loading of the motor vehicle, always correctly directed with respect to the motor vehicle wheel 10. Consequently, it is an advantage that the holder 40, in the vicinity of the unsprung mass of the motor vehicle, is connected thereto, for example as shown in FIGS. 2 and 3 at a holder plate 33 for the spring (not shown) of the motor vehicle or at a holder, connected to the axle 12 of the motor vehicle wheel 10, for a stabilizer or the like or, independently thereof, directly to the shaft 12.

In the present embodiment, there is shown a constructional situation in which the holder plate 33 for the vehicle spring (not shown) is fixedly connected in a conventional manner by means of bolts 34 to the shaft 12 of the motor vehicle wheel 10. Altogether, four bolts 34 are provided, of which two are vertically oriented in the forward travel direction (arrow 14) in front of, and the other two of which are located behind, the axle 12.

At the axle side, the holder 40 has two identical carriers 42. Each carrier 42 is provided with a first boring 44, which serves to receive a respective bolt 34, and the center line 45 of which coincides with the longitudinal axis of the respective bolt 34. It can be seen from FIG. 2 that the two bolts 34 serving to retain the carrier 42 are longer than the two other bolts 34, and that spacer bushes 46, for vertically orienting the carrier 42, can be provided beneath the holder plate 33.

Apart from the boring 44, each carrier 42 has a holder 43 in the form of an eye, a bushing or the like, with a second boring 48 which extends transversely of the first boring 44 and the axis 40 of which extends, in this embodiment, perpendicular to the center line 45. As shown by FIGS. 1 and 2, the carriers 42 are secured so that their borings 48 are aligned with one another.

A carrier bolt 60, which in the present embodiment is cylindrical, extends through the two second borings 48 of the carriers 42 and, on installation of the holder 40, is fixedly connected to the two carriers 42. This connection can be effected in any known manner, for example, by welding, riveting or adhesive. In the present embodiment, a clamp fixing is provided. For this purpose, the hole 48 of each carrier 42 is part of a slotted bushing at the free end of the carrier 42, which can be tightened by means of a clamping bolt 52 and a nut 54 so as to fixedly retain the carrier bolt 60. Equivalent to the abovedescribed embodiment of the holder 40 would be a one-piece carrier, provided with two holes 44, to which the carrier bolt 60 is so securable that it is free between its ends and/or at least at one of its ends for connection of a further element (e.g. 62) of the holder 40. The following description, however, enables it to be seen that the universality of the holder with two separate carriers 42 is greater and, therefor, is to be preferred over a one-piece carrier, when this is provided with longitudinal slots, instead of cylindrical borings 44.

The carrier bolt 60 of the holder 40 serves to hold a pin 62 which has at its end a pivot bearing 64. This pivot bearing comprises, in the present embodiment, a clamping bushing provided at the end of the pin 62, through which the carrier bolt 60 can be slid and which can be fixedly clamped by means of a clamping bolt 52 and a nut (not shown). In this case, as in all of the previously described comparable connections between the components of the holder 40, after orientation of the different elements, they can be secured relative to one another in any conventional manner.

As can be clearly seen from FIG. 1, the central axis 63 of the plug 62 extends perpendicular to the axis of the carrier bolt 60 and the holes 48. Furthermore, it can be seen that the plug 62 can be connected to the carrier bolt 60 at different positions between the two carriers 42 or outside these carriers. Consequently, there results a first level of freedom for the installation of the skid prevention device. The second level of freedom follows from the pivotability of the plug 62 with respect to the carrier bolt 60 before they are relatively locked or clamped together.

The carrier element 30, which is already mentioned above, is provided with a fork 36 at one end thereof, as shown, in particular, in FIG. 1 for supporting the pivot arm 62 for pivotation about the axis 27. Between this fork and the plate-shaped other end of the carrier element 30, which is provided with holes 31, there is located a bushing 38 for receiving a plug (e.g. 62). The axis 39 of the bushing 38 extends, in this embodiment, parallel to the pivot axis 27, and the planes containing the two axes 27 and 39 extend, in this embodiment, perpendicular to the main plane of the carrier element 30, in which lies the end of the carrier element provided with the hole 31.

Depending upon the constructional relationships, the carrier element 30 can be indirectly (not shown) or directly (as shown in this embodiment) secured to the plug 62. For this purpose, the outer diameters of the carrier bolt 60, the plug 62 and any further plugs 66 in this embodiment are equal to one another, and these parts of the holder are preferably formed as tubes. Accordingly, the receptacles (bushings, sleeves, etc.) for these parts are provided with the same internal diameters, which are adapted to said outer diameters.

In the present embodiment, for the installation of the skid prevention device two further levels of freedom are afforded in that, for the connection of a further plug 66 to the plug 62, a cross-connector 70 is provided, which can be displaced quickly and axially on the plugs. The cross-connector 70 comprises, essentially, two bushings 72, 74, which are fixed relative to one another, and which have inner diameters corresponding to the outer diameters of the plugs. These two bushings 72, 74, and the other previously mentioned bushings, are in the present embodiment sufficiently thick-walled bushings. According to FIG. 1, the axes of the bushings 72, 74 extend at a spacing from one another, and in the direction of the central axis 62 of the plug 62 and in the direction of the axis 39 of the eye 38 of the carrier element 30, respectively. The further plug 66 serves to connect the eyes 38 and 74.

The carrier element 30 can be fixed at any spacing from the bushing 74 of the cross-connector 70 and at any angular position relative to the axis 39 on the further plug 66, whereby two additional levels of freedom, and thus in the case of this embodiment a total of six levels of freedom, are provided for the installation of the skid prevention device. Since, finally, the carrier element 30 is to be fixed to the plug carrier 66 not only in the position shown, but also with its surface, shown in FIG. 1, facing downwardly, the carrier element 30 can be arranged in an almost unlimited number of special positions in the region between the shaft 12, the roadway 11 and the motor vehicle wheel 10. In this way the desired result, i.e. the usability of identical holder elements on opposite sides of the vehicle, is achieved. If the pivot arm 26, which is also an element of the holder, is formed symmetrically on both sides of the plane containing the axes 24 and 27, as is the case in this embodiment, then the pivot arm also can be employed unaltered on both sides of the motor vehicle.

The possibility which has been shown at those positions of the holder 40 for clamping connection of the holder elements allows subsequent readjustment of the holder. If the elements of the holder, however, after the initial adjustment and after subsequent welding of the parts (as an alternative to clamping) have to be readjusted, then this can be effected, in case of necessity, only in the manner known from the state of the art, i.e. by bending various components of the holder. In order to provide a possibility for readjustment even in such exceptional cases, in the present embodiment an adjustable fixing of the centrifugal wheel 22 at the free end 25 of the pivot arm 26 is provided.

There is a further modified embodiment of the arrangement of the carrier bolt 60 on the motor vehicle which is not shown in the drawings. In this modification, the axis 50 extending through the two holders 43 is inclined relative to the straight lines which extend perpendicular to at least one of the further axes 45 and connect these two axes 45. This modified arrangement can be achieved, for example, by the two carriers 42 having different lengths so that the free spacing of the center of the hole 48 relative to the center of the associated hole 44 of one carrier 42 is greater than the corresponding spacing between the two carriers.

According to FIGS. 1, 4, 5, 7 and 8, a ball joint serves to secure the centrifugal wheel 22 to the pivot arm 26. It comprises a divided metal bushing 80, which is inserted into a hole 81 at the free end of the pivot arm 26 and can be clamped there by means of a clamp bolt 52 and a nut 54, since the free end of the pivot arm 26 is slotted from its front to the vicinity of the hole 81. The bushing 80 has a shell-or ball-shaped inner surface, in which a ball element 82 rests.

The ball element 82 has a through-hole 83 extending through its center. When the ball joint comprising a bushing 80 and the ball element 82 is inserted into the hole 81 in the pivot arm 26, from the upper side of the pivot arm 26 a bolt 84 provided with a collar 85 is inserted through the boring 83 of the ball element 82. From below, a spacer bushing 86, firstly, and then the centrifugal wheel 22 with the bearing 23 thereof are slid onto the bolt. Finally, the bolt 84, the ball joint, the spacer bushing 86 and the centrifugal wheel 22 are fixedly clamped to one another by means of a nut 88 threaded onto the bolt 84. The bearing 23 ensures that the centrifugal wheel 22 can rotate freely.

In addition, the axis of rotation 24 of the centrifugal wheel 22 is given its required spatial position, which usually does not coincide with the axis 90 of the hole 81 provided in the pivot shaft 26. Finally, the nut 54 is drawn onto the clamp bolt 52 and thereby the adjusted position of the rotation shaft 24 is fixed. Readjustment of the position of the rotation shaft 24 is possible, if necessary, at any time by release of the clamping bolt 52.

It should be pointed out that the ball joint 80, 82 does not necessarily need to be mounted in the boring 81 of the pivot arm 26, but that the ball joint can also be provided on or in an extension of the pivot arm, which in turn is movable and/or adjustable relative to the pivot arm.

In the modified embodiment illustrated in FIG. 5, there is provided for receiving the ball joint 80, 82 not merely a simple boring in the pivot arm 26, but, two parallel through-holes 81 and 89, connected by a slot 87. In the vicinity of the slot 87, a clamping bolt 82 extends through opposite sections of the pivot arm 26 separated by the slot 87.

In this embodiment, the whole of the region of the pivot arm 26 which receives the ball joint 80, 82 is provided with a wall extending therethrough, which facilitates a warpage-free casting of the pivot arm 26. The slot 87 in the interior of the head of the pivot arm enables, by tightening of the clamping bolt 52 relative to a nut 54 with consequential narrowing of the slot 87 and reduction of the diameter of the through-holes 81, 89, a secure clamping of the ball joint 80, 82 in the through-hole 81 of the pivot arm 26. The second through-hole 89 serves to provide greater elastic flexibility of the pivot arm head, which facilitates the contraction of the slot 87.

In a modified embodiment of the invention, described in greater detail below with reference to FIGS. 6 and 7, the centrifugal wheel 22 is secured on the free end 25 of the pivot arm 26 by an interpositioned centrifugal wheel carrier 100. This, furthermore, is mounted on the carrier element 30 so as to be rotatable about the pivot axis 27, and in the above described manner can be pivoted from the operational position of the centrifugal wheel into the rest position.

The centrifugal wheel carrier 100 has a housing 110, through which two parallel holes 112, 114 extend. Into the hole 112 there is pressed a rubber-metal bushing 116. It is prevented from rotating relative to the housing 110 in all normal operational situations.

The rubber-housing metal bushing 116 has, in an axial hole 117, an axially extending groove 118 for a key 120. An extension of the groove 118 is provided in the form of a groove 122 in a boring 124 in the free end 25 of the pivot arm 26. When the rubber-metal bushing 116 is pressed into the housing 110, taking into account the position of the groove 122 of the pivot arm 26, it is ensured that the the two grooves 118, 122 coincide with one another, in a position of the housing 110 relative to the pivot arm 26 which is to be described hereinafter.

For securing the housing 110 to the pivot arm 26, there is provided a flange bolt 126. It likewise has a groove 128 for key 120 and, in this embodiment, is inserted as indicated in FIG. 7 from the bottom to the top, through the central boring of the disc 130, the axial hole 117 of the rubber-metal bushing 116 and the hole 124 of the pivot arm 26. A lock-nut 132 is employed for tightening the flange bolt 126 and, therewith, for mounting the housing 110 on the pivot arm 26. The key 120, which is inserted into the flange bolt before the latter is inserted, ensures that the inner side of the rubbermetal bushing 116 cannot move relative to the flange bolt 126 and the pivot arm 26. It is pointed out that any axial rubber preloading which may be produced on pressing of the rubber-metal bushing 116 into the housing 110 can be pressed back at both axial ends of the boring 112 into the interior of the rubber-metal bushing 116 for increasing the insertion force by means of the disc 130 and by means of the undersurface of the pivot arm 26.

The housing 110, secured in the above-described manner to the pivot arm 26, due to the effect of the rubber within the rubber-metal bushing 116, can be elastically or resiliently pivoted about the axis 113 of the boring 112.

The same movability can be achieved, in a corresponding manner, if the spring element 116 is either pressed with its outer bushing into the correspondingly enlarged hole 124 of the pivot arm or is secured in another manner at the free end 25, and if the boring 112 of the housing 110 is reduced by the dimension of the flange bolt 126 and provided with a groove oriented so as to be aligned with the groove 118.

The centrifugal wheel 22 with the bearing 23, which is only indicated, can be fixed on the housing 110 by means of a bolt which extends through the hole 114 and which also extends through the bearing 23. It is preferred, however, that the securement described above with reference to FIG. 4 is employed, which makes it possible, in this case, to incline the axial rotation of the centrifugal wheel 22 relative to the plane or pivotation of the housing 114 about the axis 113.

For this purpose, the divided bushing 80 is inserted into the hole 114 in the housing 110. It has in this embodiment, also, a shell-shaped through-extending inner hole for receiving the axially bored ball element 82. The bolt 84, provided with a collar, extends through the axial boring of the ball element 82, the spacer bushing 86 provided beneath the housing 110 and the bearing 23 of the centrifugal wheel 22 and is secured by means of the nut 88.

As can be seen from FIG. 7, the housing 110 is slotted in the vicinity of its hole 114 from the exterior as far as the hole. Furthermore, a clamp bolt 52 and a nut 54 threaded onto the end thereof are provided. The clamp bolt extends through an additional hole in the housing 110, in the vicinity of the above-mentioned slot, so that by means of the clamping bolt 52 and the nut 54, the divided bushing 80 can be secured within the hole 114. It makes sense that the bolt 84, before the clamping of the clamping bolt 52 can be tilted together with the ball element 82 through a certain amount, so that the longitudinal axis of the bolt 84 does not necessarily extend parallel to the axis 113. The shell-shaped inner boring of the divided bushing 80 and the outer surface of the ball element 82 are formed roughly so that, even under the effect of impact, a secure positioning of the bolt 84 within the housing 110 is ensured.

FIGS. 3 and 6 show the manner of installation of the centrifugal wheel carrier 100 relative to the pivot arm 26 and relative to the motor vehicle wheel 10. All essential details are shown in the above-mentioned figures of the drawings, so that reference is made to these drawings.

The arrangement illustrated in FIG. 6 is preferred. The line of connection 134 of the centre of the holes 112, 114 of the housing 110 extends, when the pivot arm 26 is in the operable position, substantially perpendicular to the line of projection 136 of the inner surface of the motor vehicle 10, as can be seen from FIG. 6. As shown in FIG. 1, the plane of rotation of the centrifugal wheel 22 lies, in its basic position, parallel beneath the plane of pivotation of the centrifugal wheel carrier 100. The axis of the bolt 84 extends parallel to the axis 113 of the hole 112. Furthermore, the hole 112 of the housing 110, and therewith also the free end 25 of the pivot arm 26, are located in the region between the inner surface (projection line 136) of the motor vehicle wheel 100 and the hole 114 of the housing 110. In other words, the housing 110, as seen from the pivot arm 26, projects away from the motor vehicle wheel 10.

The arrow 138 in FIG. 6 indicates the direction of rotation of the centrifugal wheel 22 during forward motion of the motor vehicle. The dash-dot circular line 22' in FIG. 6 shows that the centrifugal wheel moves rearwardly when the chain lengths 20 are released with a delay by the motor vehicle wheel 10. It can also been seen that the pivot arm 26, due to the above-described arrangement, is pressed against the motor vehicle wheel 10, during such a delayed release, with an additional force component. When the initially delayed length of chain is finally released, the centrifugal wheel 22 again returns to the zero position shown in FIG. 6 by thick circular line.

Finally, it is preferred that the centrifugal wheel carrier 100 is so arranged relative to the pivot arm 26, and that the two above-mentioned grooves 122, 128 so coincide with one another, that the line of connection 134 is intersected by a vertical line extending from the centre line of the shaft 12.

In an embodiment of the invention which is not illustrated, the free end 25 of the pivot arm 26 is formed fork-shaped. In the intermediate space between the two fork elements lies the end of the housing 110 which receives the rubber-metal bushing 116. It is understood that, in this case, the hole 124 extends through both elements of the fork and that, also, the groove 122 extends through both elements.

In a modified embodiment illustrated in FIG. 8, instead of a rubber-metal bushing, there is provided a different type of spring system for the mounting of the centrifugal wheel 22 on the pivot arm 26.

In operation of the above-described springing with the rubber-metal bushing, it may occur that this may be damaged by a heavy loading or by aging, the rubber part being released from the metal sleeve or from the metal core. When this occurs, the elements of the rubber-metal bushing can rotate relative to one another, so that the spring effect is reduced and, in the worse case, is lost.

In order to avoid this, in the embodiment illustrated in FIG. 8 the pivot arm head of the pivot arm 26 is formed as a fork head 91 with two fork arms 104 which extend vertically one above the other. Each fork arm 104 has a vertical hole 92 and the holes 92 are aligned with one another.

In the space between the fork arms 104, a shaped member 96 of resilient material, preferably of hard rubber, is so inserted that it abuts against the rear wall 106 of the fork head 91 which connects the fork arms 104. Two webs 105 projecting between the fork arms 104 from the rear wall 106 at opposite vertical sides of the fork head enclose a part 108, abutting the rear wall 106, of the shaped member 96 between them and thus prevent lateral displacement of the shaped member 96 from the region between the form arms 104.

The inserted shaped piece 96 extends between the fork arms 104 not entirely as far as the region of the holes 92 thereof. In this region, there remains a space which serves to receive a compensating lever 97.

The compensating lever 97 is so shaped that it can be inserted between the fork arms 104 in a substantially convenient manner.

The compensating lever 97 has a hole 98, which when the lever is pushed between the fork arms 104 is aligned with the holes 92. In this position, the compensating lever 97 is mounted on the fork arms 104 in a pivotable manner by a short shaft 94 extending through the holes 92 and through the holes 98. The shaft 94 is inserted into two bushings 93, each received in a respective one of the borings 92, the collars of which abut the respective inner surfaces of the fork arms 104.

A horizontal boring 101 extends through the compensating lever 97 and thereby intersects the hole 98. It is aligned, in the assembled condition of the compensating lever 97, with a corresponding boring 95 in the shaft 94. A slotted pin 99 is received in the borings 101 and 95 and connects the compensating lever 97 to the shaft 94 for rotation of these two parts with one another.

At its side facing the formed piece 96 in the assembled condition, the compensating lever 97 carries two corner projections 102, which engage in corner grooves 106 in the shaped member 96 in a nested manner.

The compensating lever also carries, on an extension which, in the assembled condition, projects laterally between the fork arms 104, a clamping sleeve 107 which forms a hole 81 of the above-described type for clamping the ball joint 80, 82.

In the assembled condition, the compensating lever 97, by means of the clamping sleeve 107, carries the centrifugal wheel 22 fixed in the above-described manner to the ball joint 80; 82. Upon deflection of the centrifugal wheel 22 by an impact or the like, the compensating lever 97 swings relative to the fork head 91, the shaped piece 96 being deformed. The elasticity of the shaped piece 96 resiliently stops the deflection and subsequently returns the compensating lever 97. The engagement of the corner projections 102 with the corner grooves 103, and the seating of the shaped piece 96 between the webs 105, prevent the shaped piece 96 from being pressed out from between the fork arms 104.

This resilient mounting of the compensating lever 97 retains the centrifugal wheel 22 resiliently against the motor vehicle tire and effects an efficient vibration reduction, even over a long period of time. The symmetrical mounting of the compensating lever 97 on the shaped piece 96 causes a deflection in either of two pivot directions to be resiliently uniformly stopped. The symmetry of the components enables installation at both sides of the vehicle.

We claim:

1. A centrifugal chain assembly for a motor vehicle, said chain assembly being mountable on either side of a vehicle and being mountable on vehicles of different types and sizes, said centrifugal chain assembly comprising holder means fixed at one side to the motor vehicle, a skid prevention device carried by said holder means, said skid prevention device including a centrifugal wheel carrying a plurality of lengths of chain, a pivot arm, said centrifugal wheel being rotatably mounted on said pivot arm and being pivotable by means of a pivotation mechanism from a rest position to an operative position in which said centrifugal wheel is urged against a side wall, facing inwardly of the motor vehicle, of a motor vehicle wheel so as to be rotated by the motor vehicle wheel, said holer means comprising two spaced holder members, a carrier bolt connected to said holder members, an adjustably positioned pivot bearing mounted to said carrier bolt, a plug member carried by said pivot bearing, a carrier element, means interconnecting said carrier element and said centrifugal wheel, said carrier element being supported from said first named plug member and having a plug-receiving bushing formed therein.

2. Assembly as claimed in claim 1, in which two holders are components of carriers, and the carriers have two spaced holes, which are directed perpendicular to one another, of which one hole has an inner diameter corresponding to the outer diameter of a bolt at the motor vehicle side and the other, associated with the holder, has an inner diameter corresponding to the outer diameter of the carrier bolt.

3. Assembly as claimed in claim 1, comprising a plug member provided at one axial end thereof with a bushing, in which the centerline of the bushing extends at an angle with respect of longitudinal axis of the plug member and in which the inner diameter of the bushing corresponds to the outer diameter of the carrier bolt.

4. Assembly as claimed in claim 3, in which the axis of said bushing extends perpendicular to the longitudinal axis of said plug member.

5. Assembly as claimed in claim 2, with a plug member provided, at one axial end thereof, with a bushing, in which the centerline of the bushing extends at an angle to the longitudinal axis of the plug member and in which the inner diameter of the bushing corresponds to the outer diameter of the carrier bolt.

6. Assembly as claimed in claim 5, wherein axis of the bushing extends perpendicular to the longitudinal axis of the plug member.

7. Assembly as claimed in claim 1, further comprising a cross-connector formed by two bushings, in which the inner diameters of the two bushings correspond to the outer diameter of the plug member and in which the centerlines of the holes of the bushings extend substantially perpendicular to one another and at a spacing from one another which is at least equal to the outer diameter of the plug member.

8. Assembly as claimed in claim 7, wherein the two bushings of the cross-connector comprises two bushings or sleeves lying one after the other and connected to one another.

9. Assembly as claimed in claim 7, in which said carrier element is connected to the carrier bolt by means of two plug members connected together by a cross-connector.

10. Assembly as claimed in claim 1, in which the axis of said bushing of said carrier element extends parallel to the axis of pivotation of the pivot arm.

11. Assembly as claimed in claim 1, further comprising a substantially plate-shaped carrier element, in which the plane of the carrier element, common to the axis of pivotation of the pivot arm and the axis of the bushing, extends perpendicular to the main plane of the plate forming said carrier element.

12. Assembly as claimed in claim 1, wherein the carrier element has at one end thereof a fork for pivotable mounting of the pivot arm and means for securing said pivotation mechanism to said beyond the region of carrier element spaced from said bushing.

13. Assembly as claimed in claim 1, wherein at least some of the elements connecting the carrier element to the vehicle have clamping elements for force-locking connection.

14. Assembly as claimed in claim 1, wherein at least some of the elements of the holder connecting the carrier element to the motor vehicle are welded, or riveted to one another.

15. Assembly as claimed in claim 1, in which the outer diameters of all plug members and of said carrier bolt are equal.

16. Assembly as claimed in claim 1, in which the bolt carrying the centrifugal wheel at the free end of the pivot arm is fixed to the pivot arm by means of a ball joint which is adjustable fixable by clamping.

17. Assembly as claimed in claim 1, in which two parallel through-holes, connected by a slot, are provided at the end of the pivot arm carrying the centrifugal wheel, one of said through-holes being provided with a ball joint, which can be secured by clamping, for receiving a bolt carrying the centrifugal wheel, and in which a clamping bolt is provided for contracting said slot for reducing diameter of the through-holes.

18. Assembly as claimed in claim 1, in which the axis of said carrier bolt is directed at an inclination to a straight line connecting the points of attachment of said holder members to said vehicle.

19. Assembly as claimed in claim 1, in which the two carriers for the carrier bolt are identically constructed.

20. Centrifugal chain assembly for a motor vehicle, having a holder fixed at one side to the motor vehicle and
a skid prevention device carried by the holder with a centrifugal wheel carrying a plurality of lengths of chain, said wheel being rotatably mounted on a pivot arm forming part of the holder and pivotable by means of a pivotation mechanism from a rest position into an operative position, in which the centrifugal wheel is urged against a side wall, facing inwardly of the motor vehicle, of a motor vehicle wheel so as to be rotated by the motor vehicle wheel, wherein an adjustable ball joint is provided between the pivot arm and the centrifugal wheel.

21. Assembly as claimed in claim 20, in which the center of the plane of rotation of the centrifugal wheel lies at a spacing below the center of the ball joint.

22. Assembly as claimed in claim 20, in which the ball joint comprises a divided metal bushing and a ball element arranged in a shell-shaped inner boring of the metal bushing, which has a boring extending through the center thereof for receiving a bolt which, in turn, carries the centrifugal wheel, and in which said divided bushing is fixed in a hole of variable diameter on or in the pivot arm.

23. Assembly as claimed in claim 20, in which the bolt has a collar which abuts the ball element.

24. Assembly as claimed in claim 22, in which there is provided a spacer bushing on said bolt between the side of said ball element facing away from said collar and the bearing of said centrifugal wheel.

25. A centrifugal chain assembly for a motor vehicle, said assembly comprising a holder mounted to one side of said motor vehicle, a skid prevention device carried by said holder, said device including a centrifugal wheel carrying a plurality of lengths of chain, said holder including a pivot arm, support means rotatably mounting said centrifugal wheel from said pivot arm, said pivot arm being pivotable by means of a pivotation mechanism from a rest position into an operative position in which said centrifugal wheel is urged against a side wall, facing inwardly of the motor vehicle, of a motor vehicle wheel so as to be rotated by said motor vehicle wheel, said support means including a spring element and members cooperating with said spring element for permitting movement of said centrifugal wheel in a predetermined plane against the action of said spring element.

26. Centrifugal chain assembly as claimed in claim 25, in which the spring element connects the pivot arm to a lever and the centrifugal wheel is rotatably mounted at a free end of this lever.

27. Centrifugal chain assembly as claimed in claim 26, in which the free end of the lever is located on the opposite side of the pivot arm, located in the operative position, from the motor vehicle wheel driving the centrifugal wheel.

28. Centrifugal chain assembly as claimed in claim 26, in which the spring element is a rubber-metal bushing, the outer metal ring of which is secured for rotation with the lever and the inner metal ring of which is non-rotatbly connected to the pivot arm.

29. Centrifugal chain assembly as claimed in claim 28, in which mutually aligned grooves in the inner metal ring of the rubber-metal bushing and in a hole in the pivot arm, and a flanged bolt provided with a key for connecting the lever to the pivot arm are provided.

30. Centrifugal chain assembly as claimed in claim 26, in which the lever is formed by a housing having two parallel, spaced holes, one of the holes receiving the spring element and the other of the holes receiving a fixing element for securing the centrifugal wheel.

31. Centrifugal chain assembly as claimed in claim 30, in which the spring element is a rubber-metal bushing, the outer metal ring of which is secured for rotation with the housing and the inner metal ring of which is nonrotatably connected to the pivot arm.

32. Centrifugal chain assembly as claimed in claim 31, in which mutually aligned grooves in the inner metal ring of the rubber-metal bushing and in a hole in the pivot arm, and a flanged bolt provided with a key for connecting the housing to the pivot arm are provided.

33. Centrifugal chain assembly as claimed in claim 30, in which said centrifugal wheel is fixed to said housing so as to be adjustable relative to the predetermined plane of pivotation.

34. Centrifugal chain assembly as claimed in claim 33, in which a ball joint, adjustable fixable by means of a clamping device, is provided at the free end of the housing for the movable arrangement of the centrifugal wheel relative to the predetermined plane.

35. Centrifugal chain assembly as claimed in claim 34, in which the ball joint has a split bushing which can be fixedly clamped in the hole in the housing and which is provided with a shell-shaped inner boring, in which rests a ball element provided with an axial throughboring, through which extends a bolt serving for mounting the centrifugal wheel on the housing.

36. Centrifugal chain assembly as claimed in claim 26, in which the free end of the pivot arm is forkshaped and the end of the lever provided with said spring element is located between the fork elements.

37. Centrifugal chain assembly as claimed in claim 26, in which the spring element is fixedly arranged at the free end of the pivot arm and the lever is provided with a hole having a groove for the key.

38. Centrifugal chain assembly as claimed in claim 30, in which the free end of the pivot arm is forkshaped and the end of the housing provided with the spring element is located between the fork elements.

39. Centrifugal chain assembly as claimed in claim 30, in which said spring element is fixedly arranged at the free end of the pivot arm and the housing is provided with a boring having a groove for the key.

40. Assembly for motor vehicles, having a holder fixed at one side to the motor vehicle and
a skid prevention device carried by said holder with a centrifugal wheel which carries a plurality of lengths of chain, is rotatably mounted on a pivot arm forming part of the holder and is pivotable by means of a pivotation mechanism from a rest position to an operative position in which the centrifugal wheel is urged against a side wall, facing inwardly of the motor vehicle, of a motor vehicle wheel so as to be rotated by the motor vehicle wheel, wherein a compensating lever pivotably connected to the free end of the pivot arm, which at its pivotably connected end abuts a shaped body of resilient material which it resiliently deforms on pivotation relative to the pivot arm, and which carries the centrifugal wheel at its free end.

41. Assembly as claimed in claim 40, in which the compensating lever is pivotably mounted at its pivotably connected end between two fork arms of a free end of the pivotable arm formed as a fork head.

42. Assembly as claimed in claim 41, in which a shaft extends through aligned holes in the fork arms and the compensating lever.

43. Assembly as claimed in claim 41, in which the shaped member is held in nested engagement between the fork arms, a rear wall connecting the fork arms and the compensating lever.

44. Assembly as claimed in claim 43, in which two webs projecting from the rear wall between the fork arms are provided for laterally supporting the shaped member at the fork head.

45. A centrifugal chain assembly as claimed in claim 43, in which a side of the compensating lever facing towards the shaped member is in nested engagement with the shaped member.

46. A centrifugal chain assembly as claimed in claim 45, in which the compensating lever has two projections in locking engagement corresponding recesses in the shaped member.

47. A centrifugal chain assembly as claimed in claim 43, wherein said shaped member comprises rubber.

48. A centrifugal chain assembly as claimed in claim 40, in which a clamping device is provided at the free end of the compensating lever for clamping a ball joint carrying the centrifugal wheel.

* * * * *

UNITED STATES PATENT AND TRADEMARK OFFICE
CERTIFICATE OF CORRECTION

PATENT NO. : 4,745,993
DATED : May 24, 1988
INVENTOR(S) : Schulz, et al.

It is certified that error appears in the above-identified patent and that said Letters Patent is hereby corrected as shown below:

Col. 12, line 34: "holer" should be -- holder --

Col. 13, line 29: "to said beyond the region of carrier element spaced from said..." should be -- to said carrier element spaced from said --

Col. 13, line 45: "adjustable" should be -- adjustably --

Col. 14, line 53: "rotatbly" should be -- rotatably --

Col. 15, line 11: "adjustable" should be -- adjustably --

Signed and Sealed this

Twentieth Day of December, 1988

Attest:

DONALD J. QUIGG

*Attesting Officer*   *Commissioner of Patents and Trademarks*